US011391317B2

(12) United States Patent
     Liu

(10) Patent No.: US 11,391,317 B2
(45) Date of Patent: Jul. 19, 2022

(54) SUCKTION CUP

(71) Applicants: FREE-FREE(USA) INC, Rancho Cucamonga, CA (US); FREE-FREE INDUSTRIAL CORP, Taipei (TW)

(72) Inventor: Sheng-Yu Liu, Taipei (TW)

(73) Assignees: FREE-FREE(USA) INC, Rancho Cucamonga, CA (US); FREE-FREE INDUSTRIAL CORP, Taipei (TW)

(*) Notice: Subject to any disclaimer, the term of this patent is extended or adjusted under 35 U.S.C. 154(b) by 0 days.

(21) Appl. No.: 17/286,768

(22) PCT Filed: Oct. 25, 2018

(86) PCT No.: PCT/US2018/057535
    § 371 (c)(1),
    (2) Date: Apr. 19, 2021

(87) PCT Pub. No.: WO2020/086085
     PCT Pub. Date: Apr. 30, 2020

(65) Prior Publication Data
     US 2021/0277932 A1    Sep. 9, 2021

(51) Int. Cl.
    *F16B 47/00*     (2006.01)
    *F16B 21/09*     (2006.01)
(52) U.S. Cl.
    CPC .............. *F16B 47/00* (2013.01); *F16B 21/09* (2013.01)
(58) Field of Classification Search
    CPC .... F16B 47/00; F16B 2200/00; B66C 1/0212; F16M 13/022
    USPC ...... 248/467, 683, 537, 205.5, 205.8, 206.2, 248/206.3, 309.3, 362, 363
    See application file for complete search history.

(56) References Cited

U.S. PATENT DOCUMENTS

| 2,542,101 A * | 2/1951 | Suben | B24B 13/005 |
| | | | 248/205.8 |
| 5,078,356 A | 1/1992 | Adams | |
| 7,458,541 B1 * | 12/2008 | Chang | A47K 10/3836 |
| | | | 248/205.8 |
| 7,793,899 B2 * | 9/2010 | Fan | F16B 47/006 |
| | | | 248/292.12 |

(Continued)

OTHER PUBLICATIONS

Search Report dated Jan. 22, 2019 of the corresponding PCT application No. PCT/US2018/057535.

*Primary Examiner* — Muhammad Ijaz
(74) *Attorney, Agent, or Firm* — Chun-Ming Shih; HDLS IPR Services

(57) ABSTRACT

A suction cup comprises a suction cup member, a press ring, a first housing and an insertion pin. The suction cup member includes an assembly surface and a suction surface. The assembly surface includes a first protrusion having a first cut-out slot formed thereon. The press ring is pressed onto an upper outer edge of the suction cup member. The first housing is pressed onto the press ring and includes a second protrusion for mounting onto the first protrusion. One side of the second protrusion includes a first through hole corresponding to the first cut-out slot to expose the first cut-out slot. The insertion pin partially engages with the first housing and slidably engages with the first through hole and the first cut-out slot to move in the first cut-out slot and to drive the suction cup member to move upward while forming a vacuum space underneath thereof simultaneously.

12 Claims, 10 Drawing Sheets

(56) References Cited

U.S. PATENT DOCUMENTS

| | | | | |
|---|---|---|---|---|
| 8,876,072 B2* | 11/2014 | Hsu | ............... | F16M 13/022 |
| | | | | 248/205.5 |
| 2008/0217826 A1* | 9/2008 | Kim | ............... | B60R 11/0258 |
| | | | | 269/21 |
| 2009/0121102 A1* | 5/2009 | Woo | ............... | G09F 7/12 |
| | | | | 248/205.7 |
| 2009/0294609 A1* | 12/2009 | Riddiford | ............... | B60R 11/02 |
| | | | | 248/206.2 |
| 2010/0116954 A1* | 5/2010 | Fan | ............... | F16B 47/006 |
| | | | | 248/205.8 |
| 2010/0282928 A1* | 11/2010 | Hsu | ............... | F16B 47/00 |
| | | | | 248/205.4 |

* cited by examiner

US 11,391,317 B2

SUCKTION CUP

CROSS-REFERENCE TO RELATED APPLICATIONS

This application is the National Phase of PCT International Application No. PCT/US2018/057535 filed on Oct. 25, 2018. The entire disclosure of the above application is all incorporated herein by reference.

BACKGROUND OF THE INVENTION

Field of the Invention

The technical field relates to a suction cup, in particular, to the structure of a suction cup using an insertion pin for lifting the suction cup.

Description of Related Art

Presently, suction cups have become one of the products commonly used in households and our daily lives, and they mainly utilize vacuum for attaching onto wall surfaces or any flat surfaces. Typically, a suction cup is provided with a hook extended therefrom, and the hook can provide the function for object hanging. Nevertheless, known suction cups are found to have defects, and the main cause of such defects is due to the excessive softness of suction cup or existence of gap allowing external air to enter into the inner side of the suction cup such that the suction force of the suction cup is insufficient, leading to falling of the suction cup.

Known suction cup typically uses an elastic material, and after a long term of use, elastic fatigue is likely to occur such that gap is generated and air is able to penetrate into the internal of the cup, causing the suction force to reduce. As a result, the suction cup cannot be stably attached onto the wall or any flat surface, and the object hung on the wall with the suction cup also falls, leading to damage of object.

SUMMARY OF THE INVENTION

An objective of the present invention is to provide a suction cup, comprising: a suction cup member, a press ring, a first housing and an insertion pin. The suction cup member includes an assembly surface and a suction surface. The assembly surface includes a first protrusion arranged thereon, and one side of the first protrusion includes a first cut-out slot formed thereon. The press ring is pressed onto the assembly surface of the suction cup member. The first housing is pressed onto a top portion of the press ring. The first housing includes a second protrusion arranged thereon. The second protrusion is mounted onto the first protrusion, and one side of the second protrusion includes a first through hole formed thereon corresponding to the first cut-out slot. The insertion pin includes an end portion formed with an inclination, and the insertion pin partially engages with a top portion of the first housing. In addition, the insertion pin uses the end portion with the inclination to slidably engage with the first cut-out slot to cause the first protrusion to move upward and to drive the suction cup member to move upward at the same time in order to allow the suction surface to form a vacuum space at a lower portion thereof.

The technical effect of the present invention is to use the insertion pin for securing the suction cup member in order to maintain the vacuum space such that it is able to prevent elastic fatigue that may cause the falling of the suction cup member. Consequently, the suction cup of the present invention is able to stably attach onto an object surface.

DETAILED DESCRIPTION OF THE INVENTION

The following provides detailed description on the exemplary embodiments of the present invention along with the accompanied drawings.

Figure 1:
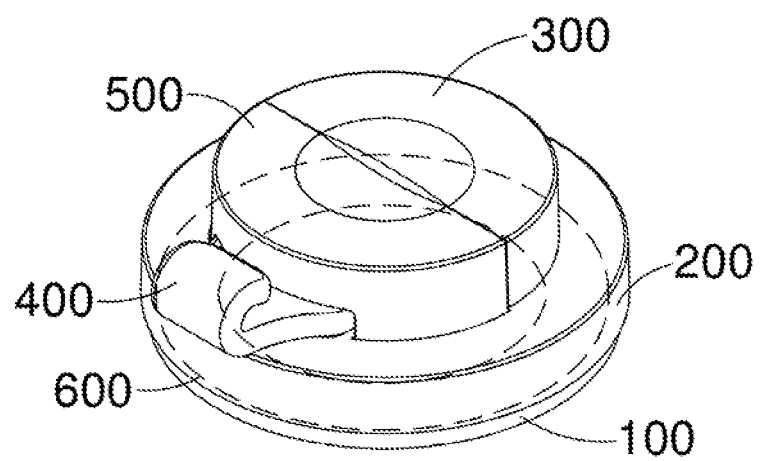
FIG. 1 is a perspective view showing the suction cup according to an exemplary embodiment of the present invention.

FIG. 1 shows a perspective view of a suction cup according to an exemplary embodiment of the present invention. As shown in the drawing, according to an exemplary embodiment of the present invention, a suction cup 10 comprises a suction cup member 100, a press ring 600, a first housing 200 and an insertion pin 300.

Figure 2:
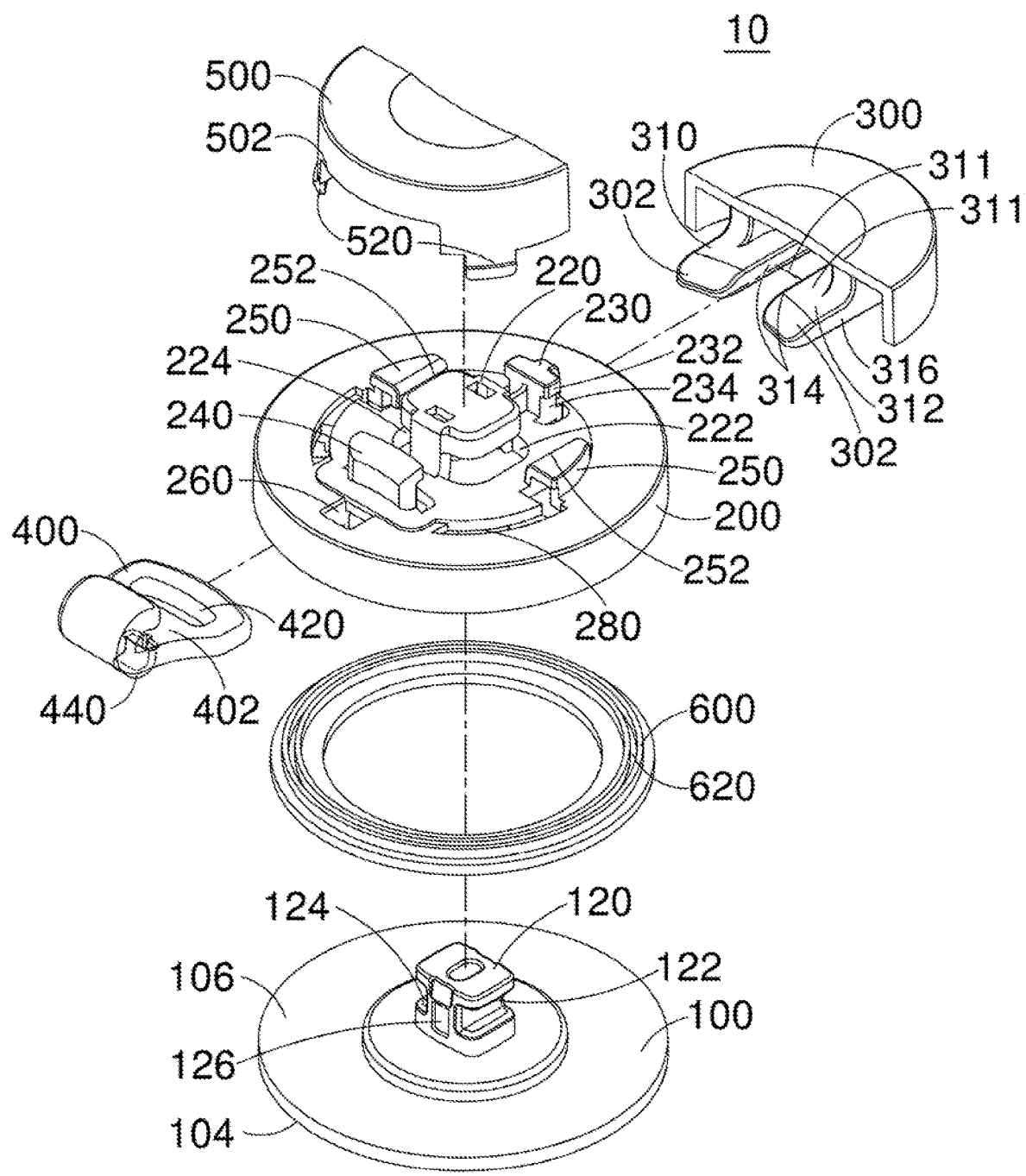
FIG. 2 is an exploded view showing the suction cup according to an exemplary embodiment of the present invention.

FIG. 2 shows an exploded view of the suction cup according to an exemplary embodiment of the present invention. As shown in the drawing, the suction cup member 100 includes a suction surface 104 at a lower portion thereof and an assembly surface at an upper portion of the suction cup member 100. The assembly surface 106 includes a first protrusion 120 arranged on a top portion thereof, and one side of the first protrusion 120 further includes a first cut-out slot 122 formed thereon. The press ring 600 is pressed onto a top portion of an outer edge of the assembly surface 106 of the suction cup member 100, and the first housing 200 is pressed onto a top portion of the press ring 600 in order to provide a downward pressing force at the outer edge of the assembly surface 106 of the suction cup member 100. In an exemplary embodiment, the first housing 200 is further used to press onto the securement slot 620 of the press ring 600 in order to prevent the first housing 200 and the press ring 600 from arbitrary movements. The first housing 200 includes a second protrusion 220 arranged on a top portion thereof. The second protrusion 220 is mounted on a top portion of the first protrusion 120, and the second protrusion 220 includes a first through hole 222 formed at one side thereof. The location of the first through hole 222 corresponds to the location of the first cut-out slot 122 of the first protrusion 120 in order to allow the first cut-out slot 122 to be exposed. The insertion pin 300 includes on end portion formed with an inclination 302. The insertion pin 300 is partially engaged on a top portion of the first housing 200 and uses the first through hole 222 to be slidably arranged at the first cut-out slot 122 of the first protrusion 120 via the inclination 302 of the end thereof. According to an exemplary embodiment, the insertion pin 300 can be an element allowing the change of its appearance color in order to improve the appearance presentation.

Furthermore, in an exemplary embodiment, the first housing 200 includes a first positioning piece 230 and at least one second positioning piece 250 arranged on a top portion thereof. The first positioning piece 230 comprises a protrusion 232 and a positioning slot 234. The positioning slot 234 of the first positioning piece 230 contacts with one side surface 314 of a first sliding piece 310 of the pin 300. the first sliding piece 300 includes one end portion formed with an inclination 302 in order to use the positioning slot 234 to guide the first sliding piece 310 of the insertion pin 300 to be slidably arranged at the first cut-out slot 122. In addition, the protrusion 232 can be used to abut against the upper edge 312 of the sliding piece 310 in order to prevent the warping of the entire insertion pin 300. In addition, the at least one second positioning piece 250 contacts with one side surface 316 of the first sliding piece 310 of the insertion pin 300 with a side surface 252 in order to maintain the position of the first sliding piece 310 and the first cut-out slot 122. Accordingly, in an exemplary embodiment, the first positioning piece 230 and the at least one second positioning piece 250 are used to achieve the technical effects of guidance and positioning.

Figure 3A:
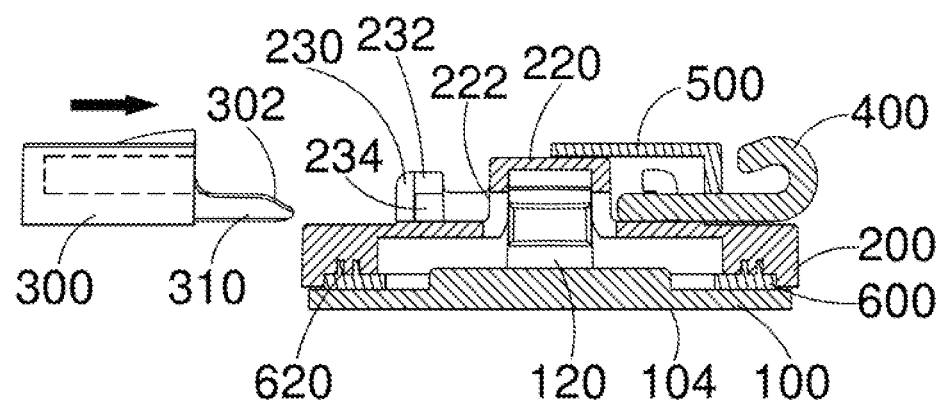
FIG. 3A to FIG. 3C are schematic views showing the actuations of the suction cup according to an exemplary embodiment of the present invention.
Figure 3B:
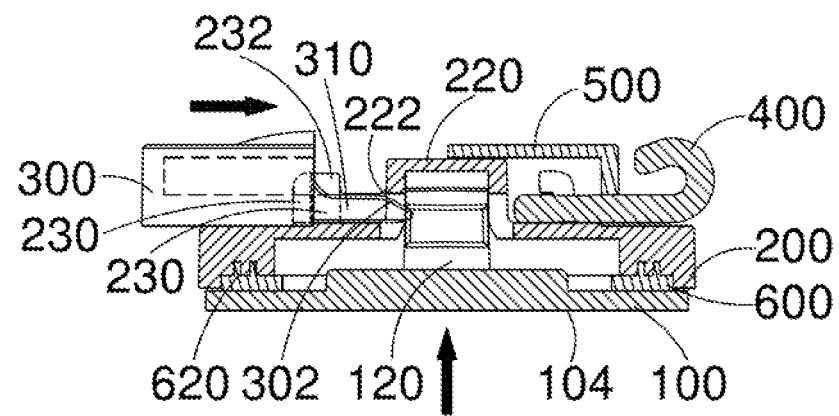
Figure 3C:
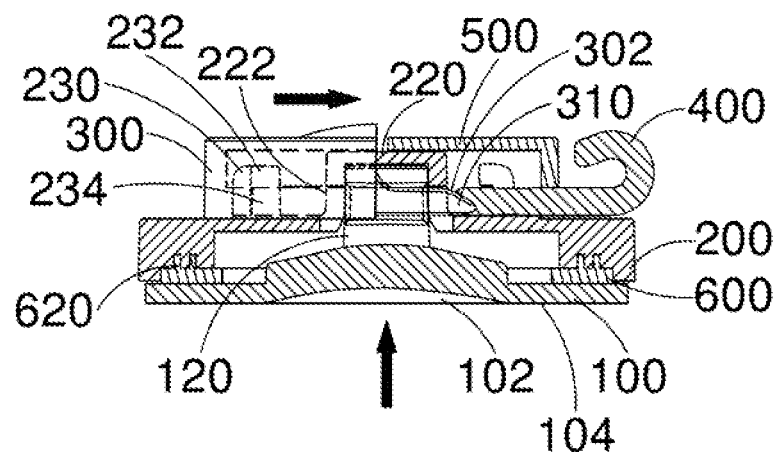

FIGS. 3A to 3C are illustration showing the actuations of the suction cup according to an embodiment of the present invention. In an exemplary embodiment of the suction cup, the insertion pin 300 partially engages with a top portion of the first housing 200 in order to provide support thereto. In an exemplary embodiment, the insertion pin 300 comprises a first sliding piece 310 arranged at a lower portion of the insertion pin 300. The first sliding piece 310 is slidably arranged at the first positioning piece 230, and it can use the positioning slot 234 to position the first sliding piece 310 of the insertion pin 300 in order to allow it to correspond to the location of first cut-out slot 122. When the insertion pin 300 passes through the first positioning piece 230, and the first sliding piece 310 is slidably arranged at the first cut-out slot 122, one side surface 252 of at least one second positioning piece 250 slidably arranged on one side surface 316 maintains contact with the cut-out slot 122. When the first sliding piece 310 is slidably arranged at the first cut-out slot 122, the first sliding piece 310 engages with a top portion of the first housing 200, and slides in the cut-out slot 122 with the inclination of the first sliding piece 310 via the at least one through hole 222. When the insertion pin 300 uses its end portion with the inclination 302 to be slidably inserted into one end of the first cut-out slit 122 and to slide to another end, it is able to cause the first protrusion 120 to move upward along with the inclination 302 of the insertion pin 300 while driving the suction cup member 100 to move upward. Consequently, a vacuum space 102 is formed at a lower portion of the suction surface 104 of the suction cup member 100. Furthermore, the insertion pin 300 is able to secure the locations of the suction cup member 100 and the first protrusion 120 such that atmospheric pressure can be utilized to allow the suction cup member 100 to be attached onto an object surface. As a result, the suction cup according to an exemplary embodiment of the present invention can be secured onto an object surface.

Figure 4:
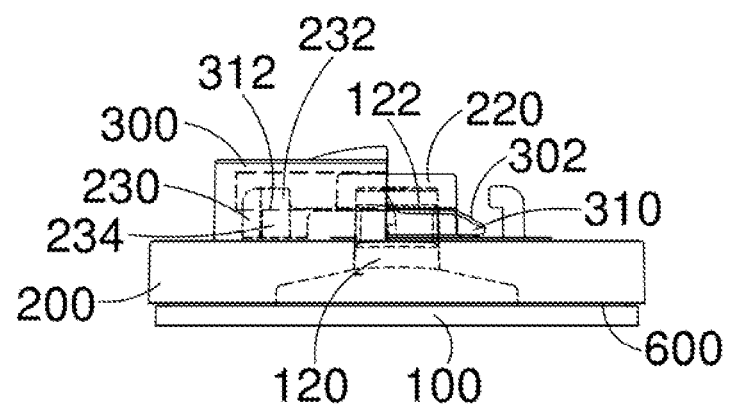
FIG. 4 is a schematic view showing the securement of the insertion pin according to an exemplary embodiment of the present invention.

Furthermore, FIG. 4 is a schematic view showing the insertion member securement according to an exemplary embodiment of the present invention. As shown in the drawing, in an exemplary embodiment, the first sliding piece 310 of the insertion pin 300 is slidably arranged at the at least one through hole 222 of the second protrusion 220 and the first cut-out slot 122. After the insertion pin 300 slides from one end of the first cut-out slot 122 to another end, the insertion pin 300 and the first cut-out slot 122 interfere with each other, and the first cut-out slot 122 presses the first sliding piece 310 of the insertion pin 300 downward in order to secure the insertion pin 300 at a top portion of the first housing 200; therefore, the insertion pin 300 can be prevented from arbitrary movements.

In addition, in an exemplary embodiment, a second housing 500 is arranged on a top portion of the first housing 200. The second housing 500 includes at least one second locking piece 520 arranged at a lower portion thereof. The at least one second locking piece 520 is inserted into the second securement hole 280 formed on a top portion of the first housing 200 in order to allow the second housing 500 to be mounted onto the second protrusion 220 for protection thereof. In addition, the second housing 500 can also be changed to different colors to improve the appearance thereof.

Furthermore, please refer to FIG. 2. In an exemplary embodiment, the first protrusion 120 further includes a second cut-out slot 124 formed on another side thereof, and the second protrusion 220 also includes a second through hole 224 formed on another side corresponding to the second cut-out slot 124. In addition, the insertion pin 300 comprises a second sliding piece 311 arranged spaced apart from one side of the first sliding piece 310 to form a channel 313. The second sliding pierce 311 includes one end formed with an inclination 302 and is slidably arranged at the second cut-out slot 124, such that it is able to clamp the first positioning piece 230 at the channel 313 together with the first sliding piece 310, and to engage with a top portion of the first housing 200. With the double-sliding piece structure formed by the first sliding piece 310 and the second sliding member 311, it is able to more stably engage with the first cut-out slot 122 and the second cut-out slot 134 of the first protrusion 120 in comparison to the structure of one single sliding piece. Moreover, after the insertion pin 300 slides from one end of the first cut-out slot 122 and the second cut-out slot 124 to another end thereof, it is able to provide more uniform support to the suction cup member 100 in order to allow its suction capability for attaching onto an object surface to be greater than that of a single sliding piece.

Figure 7A:
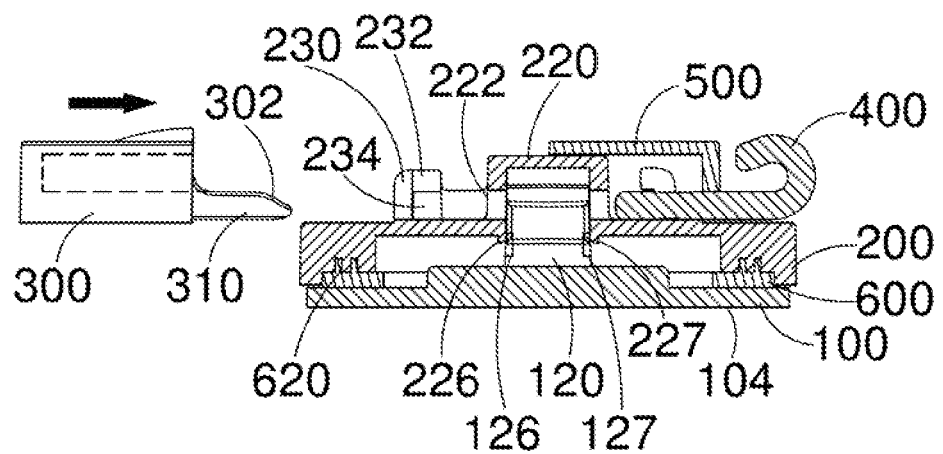
FIG. 7A to FIG. 7B are schematic views showing the structure of the engagement hooks and the actuations of the suction cup according to an exemplary embodiment of the present invention.
Figure 7B:
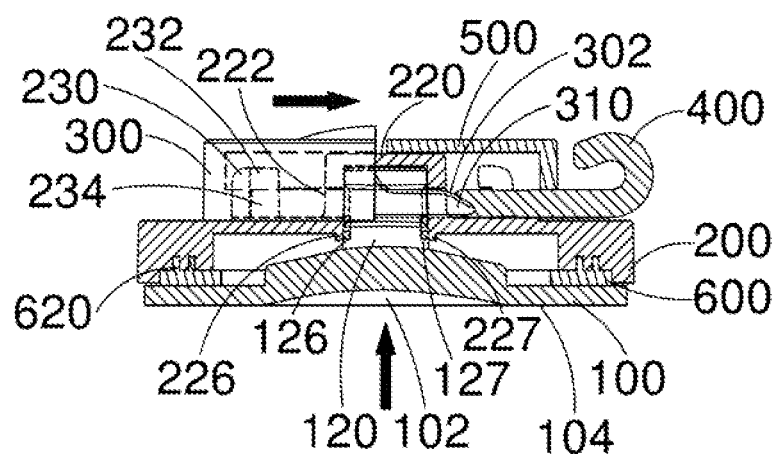

FIGS. 7A to 7B are schematic views illustrating the structure of the engagement hooks and actuation of the suction cup according to an exemplary embodiment of the present invention. As shown in the drawings, in an exemplary embodiment, the first protrusion 120 further includes at least one groove 126 formed on one side corresponding to the at least one groove 126. When the first housing 200 is mounted onto the first protrusion 120 of the suction cup member 100, the at least one engagement hook 226 is locked with one end of the at least one groove 126 in order to allow the first protrusion 120 to engage with the second protrusion 220. Accordingly, the first housing 200 is attached onto the suction cup member 100 in order to prevent the falling of the suction cup member 100.

In addition, when the first protrusion 120 moves vertically along with the insertion or disengagement of the insertion pin 300, since the length of the at least one grove 126 is greater than the length of the hooking portion of the at least one engagement hook 226, as the first protrusion 120 moves back and forth relative to the second protrusion 220, the groove 126 moves back and forward corresponding to the engagement hook 226 and maintains the engagement therebetween. In an exemplary embodiment, similarly, the first protrusion 120 can be arranged with the groove 126 and another groove 127 opposite from each other, and the second protrusion 220 corresponding to the groove 127 can be provided with another engagement hook 227. Accordingly, when the first protrusion 120 moves back and forth relative to the second protrusion 220, the second grooves 126, 217 also move relative to the two engagement hooks 226, 227 and maintain the engagement therewith. Consequently, with the structure of two engagement hooks 226, 227 correspondingly engaged with the two grooves 126, 127, the second protrusion 220 is able to hold the first protrusion 120 in order to allow the first protrusion and the second protrusion 220 to be attached onto each other more stably.

According to another exemplary embodiment of a suction cup of the present invention, the suction cup member includes the first protrusion member arranged on a top portion thereof, and one side of the first protrusion is formed of the first cut-out slot. In addition, the first housing is pressed onto a top portion of the press ring, and the press ring is further pressed onto an outer edge of the top portion of the suction cup member. Furthermore, the second protrusion of the first housing is mounted onto a top portion of the first protrusion in order to allow the first cut-out slot to be exposed out of at least one through hole. Finally, the insertion pin is slidably arranged at the first cut-out slot via the slanted surface. With the insertion pin slides at the first cut-out slot, the suction cup member is able to move upward and a vacuum space at a lower portion thereof is also formed at the same time; consequently, the suction cup according to an exemplary embodiment is able to firmly attach onto an object surface. In addition, the insertion pin is able to secure the location of the suction cup member to maintain the vacuum space in order to prevent elastic fatigue that may cause falling of the suction cup.

Furthermore, please refer to FIG. 2. As shown in the drawings, according to an exemplary embodiment of the present invention, a suction cup 10 comprises a suction cup member 100, a press ring 600, a first housing 200, an insertion pin 300 and a first hook 400.

Figure 5:
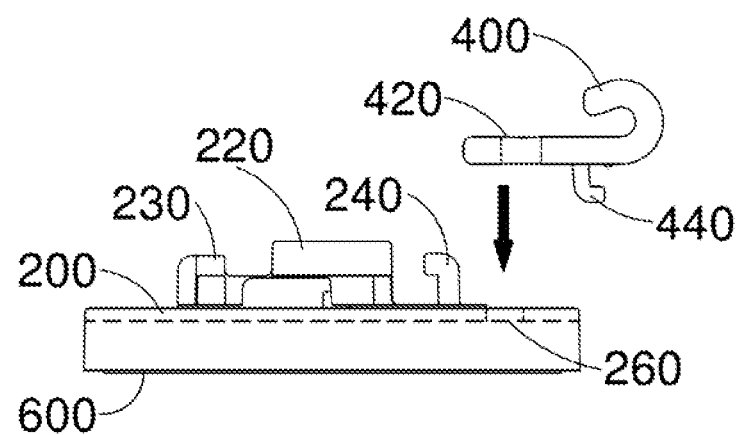
FIG. 5 is a schematic view showing the installation of the hook according to an exemplary embodiment of the present invention.

Accordingly, please refer to FIG. 2 and FIG. 5. FIG. 5 is a schematic view showing the hook according to an exemplary embodiment of the present invention. As shown in the drawing, the first housing 200 includes a third protrusion 240 arranged on a top portion thereof and a first securement hole 260 formed adjacent to the third protrusion member 240. One end of the hook 400 is formed of an installation hole 420, and the installation hole 420 is able to movably attach onto the third protrusion 240. The first hook 400 includes a first locking piece 440 arranged at a lower portion of the first hook 400 and is secured onto the first securement hole 260 formed on the first housing 200 in order to secure the first hook 400 onto the first housing 200; consequently, it is able to form a structure for object hanging. The connection and actuation relationships among other elements of the present exemplary embodiment are identical to those of the first exemplary embodiment of the present invention; therefore, relevant details are omitted hereafter.

In addition, in an exemplary embodiment, the first housing 200 further includes a second housing 500 arranged on a top portion thereof. The second housing 500 includes at least one second locking piece 520 arranged at a lower portion thereof. The second locking piece 520 is inserted into a second securement hole 280 formed on a top portion of the first housing 200 in order to allow the second housing 500 to be mounted onto the second protrusion 220 and a portion of the first hook 400 for protection thereof. Furthermore, the lower edge 502 of the second housing 500 presses against the upper edge 402 of the first hook 400 in order to strengthen the securement of the first hook 400 on the first housing 200. Moreover, the second housing 500 can also be changed to different colors in order to improve the appearance thereof.

Figure 6:
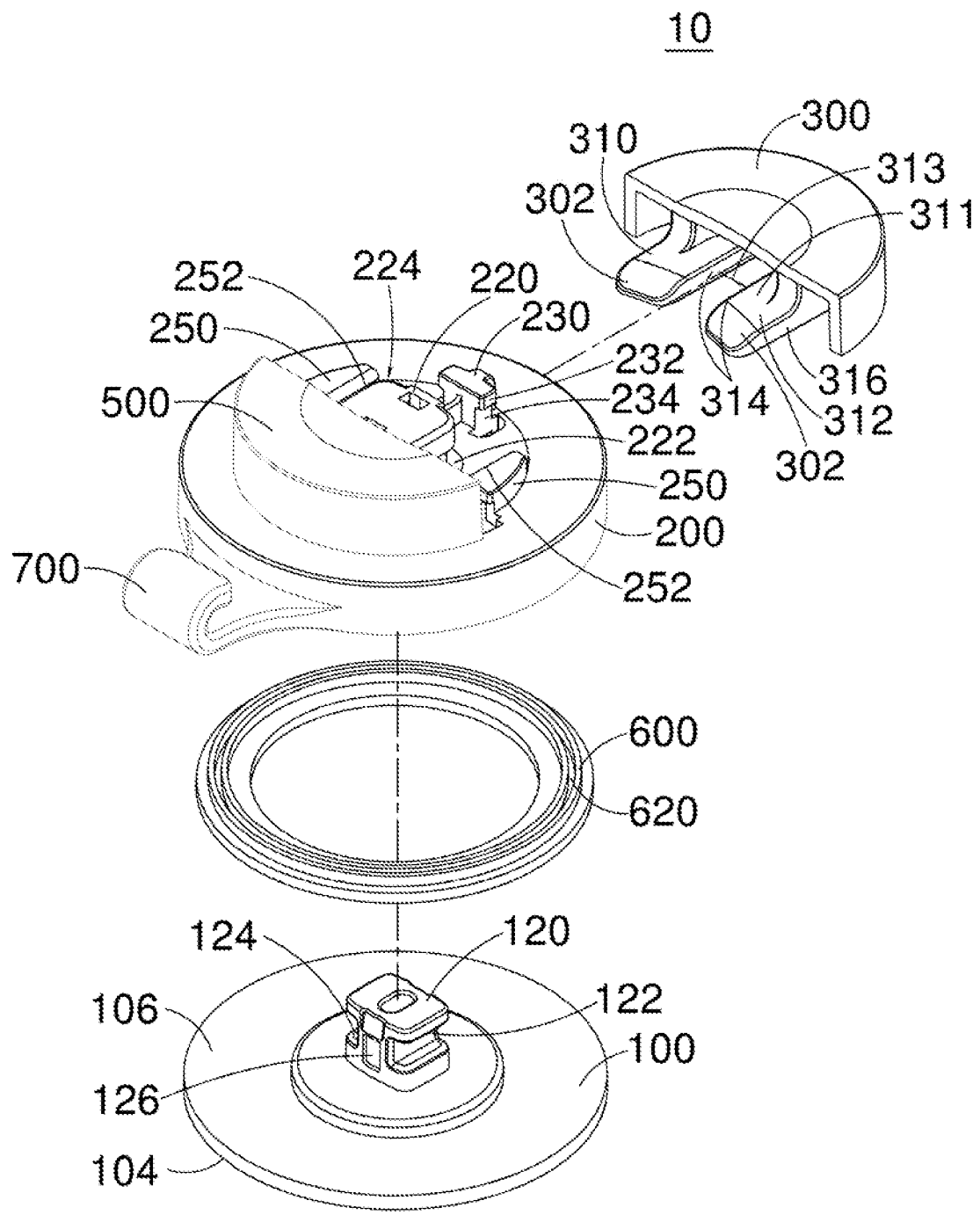
FIG. 6 is a perspective view of the suction cup according to another exemplary embodiment of the present invention.

Please refer to FIG. 6, showing a schematic view of the suction cup according to another embodiment of the present invention. In the present exemplary embodiment, a second hook 700 is used to replace the first hook 400 in the first exemplary embodiment. In the present exemplary embodiment, the first housing 200 includes a second housing 500 arranged on a top portion thereof, and one side of the first housing 200 includes a second hook 700 arranged thereon. The first housing 200, the second housing 500 and the second hook 700 are integrally formed into one single structure. With the integrally formed first housing 200, second housing 500 and the second hook 700, the structural strength of the present exemplary embodiment is increased such that it can be used for hanging an object of greater weight, and the level of damage caused by the repetitive hanging can be reduced. The connection and actuation relationships among other elements of the present exemplary embodiment are identical to those of the first exemplary embodiment of the present invention; therefore, relevant details are omitted hereafter.

In view of the above, the present invention provides a suction cup, and it utilizes the insertion pin to slide at the first cut-out slot and the second cut-out slot of the first protrusion in order to drive suction cup member connected thereto to move upward and to form a vacuum space at a lower portion thereof at the same time. Accordingly, the suction cup of the present invention is able to attach onto an object surface, and the insertion pin is able to secure the location of the suction cup member and to maintain the vacuum space. Consequently, it is able to prevent the external air from entering into the inner side of the suction cup member due to the rebound or elastic fatigue of the suction cup member that may cause the falling of the suction cup. As a result, the suction cup member is able to firmly attach onto an object surface. Furthermore, the suction cup of the present invention further provides a hook on the first housing, and a locking piece and securement hole can be movably combined with the hook and the first housing, or the second hook integrally formed with the second housing in order to achieve the technical effect of the hanging of object on the suction cup of the present invention.

The above describes the preferable and feasible exemplary embodiments of the present invention for illustrative purposes only, which shall not be treated as limitations of the scope of the present invention. Any equivalent changes and modifications made in accordance with the scope of the claims of the present invention shall be considered to be within the scope of the claim of the present invention.

What is claimed is:

1. A suction cup, comprising:
   a suction cup member having an assembly surface and a suction surface; the assembly surface having a first protrusion arranged thereon, and one side of the first protrusion having a first cut-out slot formed thereon;
   a press ring pressed onto the assembly surface of the suction cup member;
   a first housing pressed onto the press ring; the first housing having a second protrusion arranged thereon; the second protrusion mounted onto the first protrusion, and one side of the second protrusion having a first through hole formed thereon respective to the first cut-out slot; and an insertion casing having a first sliding piece, one end of the first sliding piece formed with an inclination, and the insertion casing partially engaging with the first housing;

wherein the insertion casing uses the first sliding piece with the inclination to slidably move in the first cut-out slot and engage on a top portion of the first housing to lift the first protrusion and to drive the suction cup member to move at the same time in order to allow the suction surface to form a vacuum space.

2. The suction cup according to claim 1, wherein the first housing further includes a third protrusion arranged thereon.

3. The suction cup according to claim 2, further comprising a first hook; the first hook is moveably attached onto the third protrusion; one side of the first hook includes a first locking piece arranged thereon and is secured onto a first securement hole formed on the first housing.

4. The suction cup according to claim 1, wherein the first housing includes a second housing arranged on the top portion thereof.

5. The suction cup according to claim 4, wherein the second housing includes at least one second locking piece; the at least one second locking piece is inserted into a second securement hole formed on the first housing, and the second housing is mounted onto the second protrusion.

6. The suction cup according to claim 5, wherein a lower edge of the second housing presses against an upper edge of a first hook.

7. The suction cup according to claim 4, wherein the first housing includes a second hook arranged on one side thereof; and the first housing, second housing and the second hook are integrally formed as one single structure.

8. The suction cup according to claim 1, wherein the first housing includes a first positioning piece arranged on a top portion thereof; the first positioning piece comprises a protrusion and a positioning slot; the first sliding piece is slidably arranged at the positioning slot.

9. The suction cup according to claim 1, wherein the first housing includes at least one second positioning piece arranged on a top portion thereof; the first sliding piece is slidably arranged at one side surface of the at least one second positioning piece.

10. The suction cup according to claim 1, wherein the first protrusion includes a second cut-out slot formed on another side thereof; the second protrusion includes a second through hole formed on another side thereof corresponding to the second cut-out slot.

11. The suction cup according to claim 10, wherein the insertion casing comprises a second sliding piece arranged spaced apart from one side of the first sliding piece; the second sliding piece includes one end formed with an inclination and is slidably arranged at the second cut-out slot of the first protrusion as well as engages the top portion of the first housing.

12. The suction cup according to claim 1, wherein the first protrusion includes two grooves arranged opposite from each other and formed on one side adjacent to the first cut-out slot; the second protrusion includes two engagement hooks formed at an inner side thereof corresponding to the two grooves; the two engagement hooks are configured to engage with the two grooves with each other in order to allow the second protrusion to hold the first protrusion, such that when the first protrusion moves, the two grooves move corresponding to the two engagement hooks while maintaining an engagement therewith.

* * * * *